(12) United States Patent
Toishi

(10) Patent No.: US 7,253,934 B2
(45) Date of Patent: Aug. 7, 2007

(54) HOLOGRAPHIC RECORDING APPARATUS AND METHOD FOR RECORDING HOLOGRAMS

(75) Inventor: Mitsuru Toishi, Tokyo (JP)

(73) Assignee: Sony Corporation (JP)

( * ) Notice: Subject to any disclaimer, the term of this patent is extended or adjusted under 35 U.S.C. 154(b) by 125 days.

(21) Appl. No.: 11/239,705

(22) Filed: Sep. 30, 2005

(65) Prior Publication Data
US 2006/0082851 A1 Apr. 20, 2006

(30) Foreign Application Priority Data
Oct. 5, 2004 (JP) ............................ P2004-292452

(51) Int. Cl.
*G03H 1/26* (2006.01)
*G11B 7/00* (2006.01)

(52) U.S. Cl. ........................................ 359/22; 369/116
(58) Field of Classification Search ............... 359/1, 359/22, 24, 25, 27, 35; 369/116
See application file for complete search history.

(56) References Cited

U.S. PATENT DOCUMENTS
2004/0062178 A1* 4/2004 Horimai ..................... 369/103

\* cited by examiner

*Primary Examiner*—Alessandro Amari
(74) *Attorney, Agent, or Firm*—Lerner, David, Littenberg, Krumholz & Mentlik, LLP

(57) ABSTRACT

A hologram recording apparatus for carrying out holographic recording by emitting a signal beam and a reference beam onto a holographic recording medium includes a laser light source configured to output a pulsed laser beam, a splitter configured to split the laser beam into a signal beam and a reference beam, a spatial light modulator configured to modulate the signal beam or both the signal beam and the reference beam, and a controlling unit configured to control the spatial light modulator to modulate at least one of the signal beam and the reference beam with a totally dark pattern for a predetermined period of time, wherein the predetermined period begins no later than the start of the risetime of a pulse of a laser beam output from the laser light source.

11 Claims, 11 Drawing Sheets

FIG. 4A  PULSED CURRENT WAVEFORM

FIG. 4B  LASER OUTPUT WAVEFORM

FIG. 4C  SLM PATTERN

FIG. 8A  PULSED CURRENT

FIG. 8B  CHANGE IN WAVELENGTH

FIG. 8C  SLM PATTERN 1

FIG. 8D  SLM PATTERN 2

HOLOGRAPHIC RECORDING APPARATUS AND METHOD FOR RECORDING HOLOGRAMS

CROSS-REFERENCE TO RELATED APPLICATIONS

The present application claims priority from Japanese Patent Application No. JP 2004-292452 filed on Oct. 5, 2004, the disclosure of which is hereby incorporated by reference herein.

BACKGROUND OF THE INVENTION

The present invention relates to a holographic recording apparatus and a method for recording holograms.

The development of holographic recording and reproducing apparatuses for recording data employing holography has been taking place.

Such a holographic recording and reproducing apparatus is capable of generating two types of beams, a modulated signal beam (with multiplexed data) and a non-modulated reference beam. These beams are emitted at the same point on a holographic recording medium. As a result, the signal beam and the reference beam interfere with each other to form a diffraction grating (hologram) at the incident point, and data is recorded on the holographic recording medium.

Irradiating a recorded holographic recording medium with a reference beam causes a diffractive beam (reproduction beam) to be generated from the diffraction grating formed on the holographic recording medium when data was recorded. Since the reproduction beam includes data multiplexed in the signal beam used for recording, the signal beam used for recording can be reproduced by receiving the reproduction beams with a light receiving element.

Known holographic recording and reproducing apparatuses are not capable of directly modulating the laser beam when a solid-state laser or a gas laser is used as a laser source. Therefore, known holographic recording and reproducing apparatuses are provided with a modulating device, such as a mechanical shutter or an acousto-optical modulator (AOM), for modulating the laser beam after it leaves the light source. When a modulating device is used, it is difficult to reduce the size of the optical system of the holographic recording and reproducing apparatus and to reduce the production cost of such a holographic recording and reproducing apparatus.

For such a holographic recording and reproducing apparatus, the above-mentioned problems can be solved by using a laser diode. To improve the coherence of the laser diode, the use of an external resonator laser has been proposed (for example, refer to Japanese Unexamined Patent Application Publication No. 11-107377, paragraphs 0028 to 0031 and FIG. 1). When a laser diode is used as a light source, the laser beam can be directly modulated, and, thus, a laser beam modulating device for modulating a beam emitted for recording does not have to be provided.

When a laser diode is directly modulated, noise is generated at the rising edge of the beam due to the electrical current being modulated, affecting the holographic recording.

When using an external resonator laser, the intensity of the generated beam is unstable due to relaxation oscillation and some time is required until the wavelength of the beam stabilizes. If holographic recording is carried out while the wavelength is unstable (i.e., while a plurality of wavelengths are generated) and the wavelengths included in one pulse changes, the emission angle of the reproduction beam emitted from the hologram recorded with the two difference wavelength will not be aligned and noise will be reproduced.

SUMMARY OF THE INVENTION

The present invention addresses the above-identified and other problems associated with conventional methods and apparatuses and provides a holographic recording apparatus and a method for holographic recording capable of preventing noise from being recorded on a holographic recording medium.

To solve the above-identified and other problems, an embodiment of the present invention provides a holographic recording apparatus for carrying out holographic recording by emitting a signal beam and a reference beam onto a holographic recording medium includes a laser light source configured to output a pulsed laser beam, a splitter configured to split the laser beam into a signal beam and a reference beam, a spatial light modulator configured to modulate the signal beam or both the signal beam and the reference beam, and a controlling unit configured to control the spatial light modulator to modulate at least one of the signal beam and the reference beam with a totally dark pattern for a predetermined period of time wherein the predetermined period beginning no later than the start of the risetime of a pulse of a laser beam output from the laser light source.

A holographic recording apparatus according to an embodiment of the present invention is controlled so that, for a predetermined period of time beginning no later than the start of the risetime of a pulse of a laser beam output from a laser light source, the spatial light modulator modulates at least one of the signal beam and reference beam by a totally dark pattern. In this way, holographic recording onto a holographic recording medium is not carried out during the predetermined period of time. When a semiconductor laser is directly modulated, the predetermined period of time is the period of time in which noise is generated at the start of the rising time due to the modulation of the electrical current. When an external resonator laser is used, the predetermined period of time is the period of time in which the wavelength of the beam is unstable. By not carrying out holographic recording onto the holographic recording medium during the predetermined period of time, noise can be prevented from being recorded onto the holographic recording medium. Moreover, in a holographic recording apparatus according to an embodiment of the present invention, a spatial light modulator used for modulating primarily used for modulating data is provided and controlled so that at least one of the signal beam and the reference beam is modulated by a totally dark pattern. In this way, noise is prevented from being recorded. Therefore, mechanical components, such as a special shutter, do not have to be added to the holographic recording medium.

In the above, "beginning no later than the start of the risetime" refers to not only the start of the risetime but also the before the risetime. Therefore, modulating using the totally dark pattern may be started before the risetime begins. In such a case, too, the holographic recording apparatus has the same advantages as the above-described holographic recording apparatus according to an embodiment of the present invention.

(1) The laser light source of a holographic recording apparatus according to an embodiment may be a semiconductor laser, and the predetermined period may a period corresponding to the time required for stabilizing a fluctuation in amplitude detected at the rising edge of a pulse of the laser beam.

A holographic recording apparatus including a semiconductor laser as a laser light source generates noise at the beginning of signal generation by pulsed oscillation and causes the waveform of the output signal is distorted (i.e., the amplitude of the signal fluctuates). Moreover, the laser beam is delayed with respect to the pulse of the electrical current. The distortion of the waveform of the output laser beam may affect the holographic recording. To prevent the noise to be holographically recorded, holographic recording is prevented by carrying out modulation with the above-described totally dark pattern until the fluctuation in amplitude generated from the start of the risetime of the pulse of the laser beam is stabilized.

(2) The laser light source of a holographic recording apparatus according to an embodiment may be an external resonator laser, and the predetermined period may be a period corresponding to the time required for stabilizing a fluctuation in wavelength of the laser beam detected at the rising edge of a pulse of the laser beam.

An external resonator laser for a holographic recording apparatus has been proposed to increase coherence. Since a single laser diode chip generates a laser beam in multimode, the contrast of the hologram formed by this beam is low. Contrarily, an external resonator laser diode is capable of stably generating a single wavelength beam. When using this type of laser light source, the generated laser beam can be directly modulated. Thus, an additional device for modulating the laser beam for recording after the laser beam leaves the laser light source does not have to be provided. For this reason, an external resonator laser is promising as a break through for small holographic recording apparatuses. However, the actual change in the wavelength of the output laser pulse is great and is detected as a fluctuation having a serrated pattern that continues for several microseconds from the beginning of the risetime of the pulse. After the fluctuation is detected, the wavelength stabilizes, but, then, mode-hop of the wavelength occurs towards a longer wavelength in the external resonator length of the laser diode. Finally, the output stabilizes again. In actual holographic recording, the change in wavelength corresponds to the change in the emission angle of the diffracted beam. Therefore, if the wavelength changes greatly, the emission angle changes significantly and causes noise. For this reason, it is preferable that the laser beam has a single, stable wavelength when recording one hologram. In order to prevent noise from being recorded in the hologram, modulation by the above-described totally dark pattern is not carried out until the fluctuation in the wavelength of the generated laser beam observed in the beginning of the risetime of the laser pulse.

The fluctuation in wavelength of the laser beam may be detected as a serrated pattern or may be detected as a change in the wavelength to a longer wavelength caused by a mode-hop. In the latter case, noise is decreased more than the former case. In the former case, however, the recording time can be extended and energy loss can be reduced.

A method for holographic recording according to an embodiment of the present invention includes the steps of outputting a pulsed laser beam, splitting the laser beam into a signal beam and a reference beam, modulating the signal beam or both the signal beam and the reference beam and carrying out holographic recording by emitting the signal beam and the reference beam onto a holographic recording medium, and controlling the modulation so that at least one of the signal beam and the reference beam is modulated with a totally dark pattern for a predetermined period of time wherein the predetermined period beginning no later than the start of the risetime of a pulse of a laser beam output from the laser light source.

In a method for holographic recording according to an embodiment of the present invention, control is carried out so that, for a predetermined period of time beginning no later than the start of the risetime of a pulse of a laser beam output from a laser light source, the spatial light modulator modulates at least one of the signal beam and reference beam by a totally dark pattern. In this way, holographic recording on a holographic recording medium is not carried out during the predetermined period of time. Thus, noise can be prevented from being recorded on the holographic recording medium.

(1) The predetermined period may a period corresponding to the time required for stabilizing a fluctuation in amplitude detected at the rising edge of a pulse of the laser beam.

By carrying out modulation with the above-described totally dark pattern until the fluctuation in amplitude generated from the start of the risetime of the pulse of the laser beam is stabilized, noise can be prevented from being holographically recorded.

(2) The predetermined period may be a period corresponding to the time required for stabilizing a fluctuation in wavelength of the laser beam detected at the rising edge of a pulse of the laser beam.

By carrying out modulation with the above-described totally dark pattern until the fluctuation in the wavelength from the start of the risetime of the pulse of the laser beam is stabilized, noise can be prevented from being holographically recorded.

Similar as the above-described case, the fluctuation in wavelength of the laser beam may be detected as a serrated pattern or may be detected as a change in the wavelength to a longer wavelength caused by a mode-hop. In the latter case, noise is decreased more than the former case. In the latter case, noise is decreased more than the former case. In the former case, however, the recording time can be extended and energy loss can be reduced.

As described above, according to an embodiment of the present invention, control is carried out so that, for a predetermined period of time beginning no later than the start of the risetime of a pulse of a laser beam output from a laser light source, the spatial light modulator modulates at least one of the signal beam and reference beam by a totally dark pattern. In this way, noise can be prevented from being recorded onto the holographic recording medium.

DETAILED DESCRIPTION

Embodiments of the present invention will be described below with reference to the drawings.

Exemplary Structure of a Holographic Recording and Reproducing Apparatus

Figure 1:
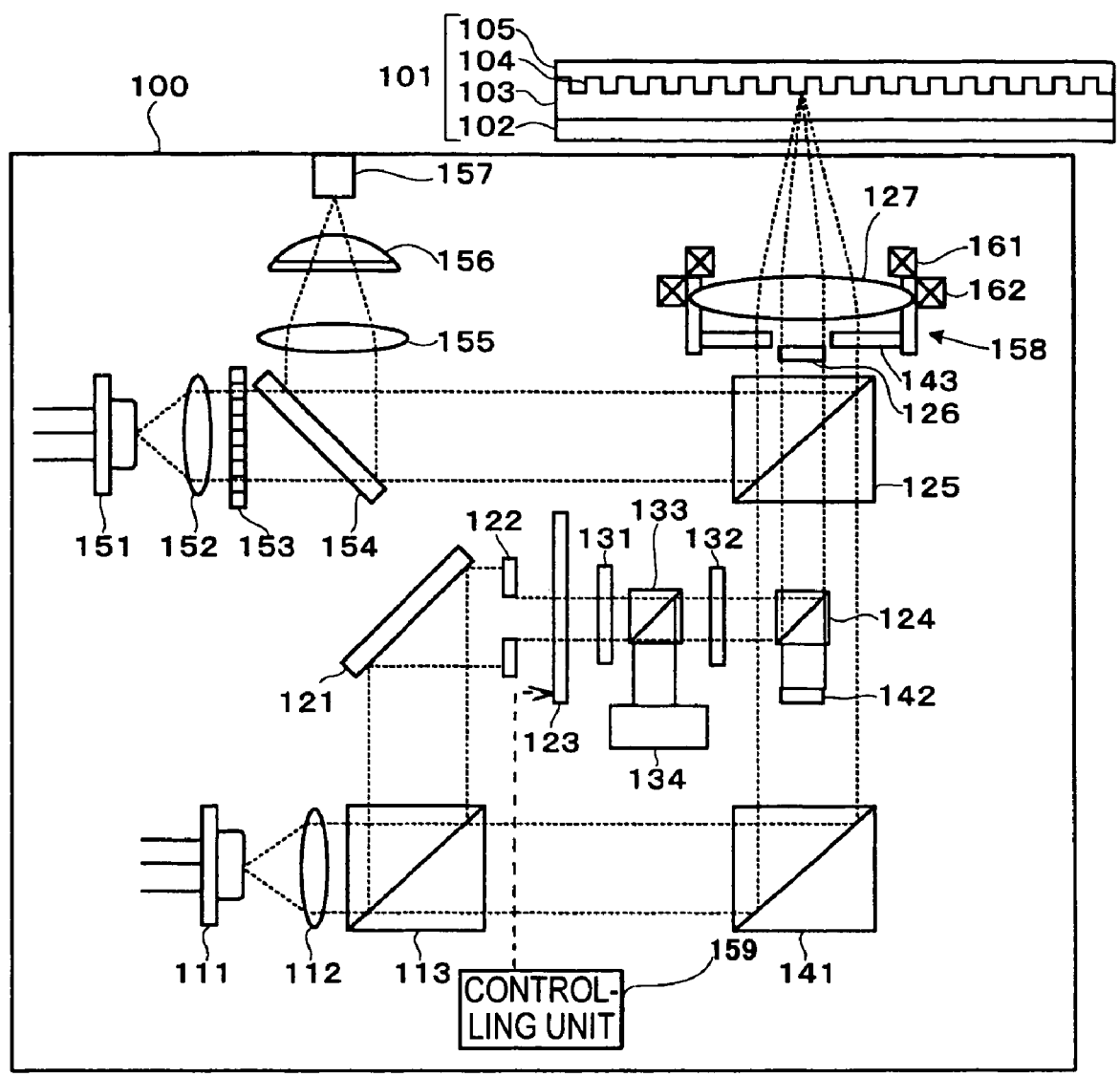
FIG. 1 is a schematic view of an optical unit of a holographic recording and reproducing apparatus according to an embodiment of the present invention.
Figure 2:
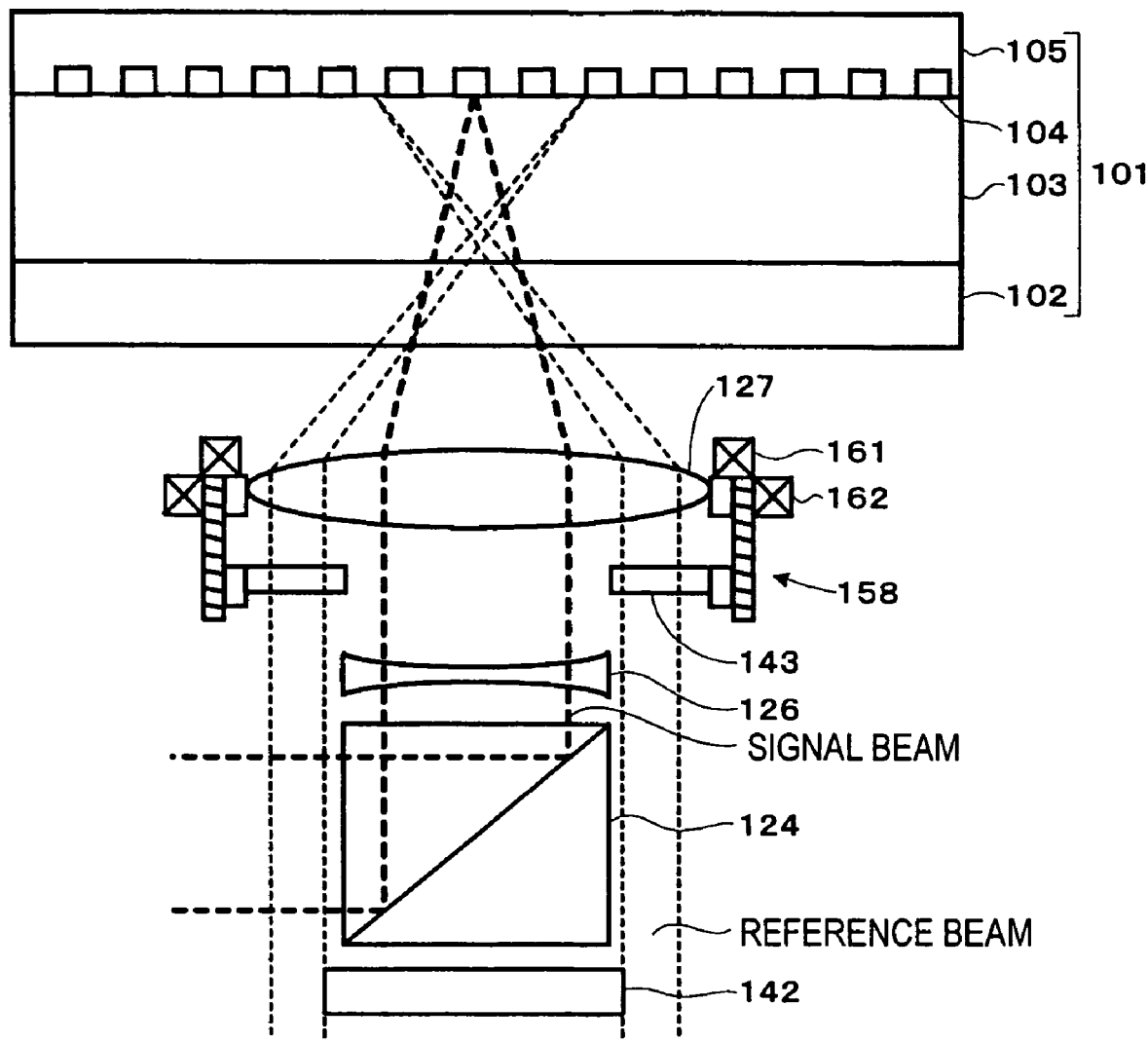
FIG. 2 is a partially enlarged schematic view of the optical unit.

FIG. 1 is a schematic view of an optical unit 100 of a holographic recording and reproducing apparatus according to an embodiment of the present invention. FIG. 2 is a partially enlarged schematic view of the optical unit 100. In FIG. 2, some optical elements are not shown to make the drawing easy to understand.

The holographic recording and reproducing apparatus is capable of recording and reproducing information on and from a holographic recording medium 101. As illustrated in FIGS. 1 and 2, the holographic recording and reproducing apparatus includes the optical unit 100.

The optical unit 100 includes a light source 111 for recording and reproducing a hologram, a collimating lens 112, a polarized beam splitter 113, a mirror 121, a pin hole 122, a spatial light modulator (SLM) 123, a mirror 124, a dichroic mirror 125, a concave lens 126, an objective lens 127, Faraday elements 131 and 132, a polarized beam splitter 133, an image pickup device 134, a mirror 141, a shielding plate 142, a phase modulating element 143, a servo light source 151, a collimating lens 152, a grating 153, a beam splitter 154, a condenser lens 155, a cylindrical lens 156, a light receiving element 157, a servo driving unit 158, and a controlling unit 159.

The holographic recording medium 101 includes a protective layer 102, a recording layer 103, grooves 104, and a reflective layer 105. The holographic recording medium 101 is a recording medium capable of recording an interference pattern generated by a signal beam and a reference beam.

The protective layer 102 is layer that functions to protect the recording layer 103 from the surroundings.

The recording layer 103 is capable of recording the interference pattern as a change in a refractive index (or transmittance). Any type of organic or inorganic material may be used to compose the recording layer 103 so long as the refractive index (or transmittance) of the material changes in accordance with the intensity of light.

An inorganic material used to compose the recording layer 103 may be a photorefractive material, such as lithium niobate ($LiNbO_3$), whose refractive index changes in accordance with light exposure due to an electro-optic effect.

An organic material used to compose the recording layer 103 may be a photopolymer. In an initial condition, a photopolymer includes monomers that are uniformly dispersed throughout a matrix polymer. When the photopolymer is irradiated with light, monomers polymerize at an exposure unit and the refractive index of the photopolymer changes.

As described above, the change in the refractive index (or transmittance) of the recording layer 103 due to light exposure enables the interference patter generated by a reference beam and a signal beam interfering with each other to be recorded as a refractive index (or transmittance) on the holographic recording medium 101.

The holographic recording medium 101 is linearly moved or rotated by a driving means not shown in the drawings and stores an image from the SLM 123 as a plurality of holograms.

Based on the movement of the holographic recording medium 101, recording or reproducing of the data stored on the holographic recording medium 101 is carried out along tracks formed in the movement direction of the holographic recording medium 101.

The grooves 104 are formed to allow servo control, such as tracking and focusing, of the holographic recording medium 101. More specifically, by providing the grooves 104 along the tracks of the holographic recording medium 101, tracking servo control and focus servo control can be carried out by controlling the focusing position and focusing depth of the signal beam so that they correspond to the grooves 104.

The light source 111 is a laser light source capable of generating a pulsed laser beam. According to this embodiment, the light source 111 is a laser diode (LD) capable of generating a laser beam having a wavelength of, for example, 405 nm.

The collimating lens 112 is an optical element capable of converting a laser beam emitted from the light source 111 into a collimated beam.

The polarized beam splitter 113 is an optical element capable of splitting the collimated beam emitted from the collimating lens 112 into a signal beam and a reference beam. The polarized beam splitter 113 emits an s-wave signal beam toward the mirror 121 and a p-wave reference beam toward the mirror 141.

The mirrors 121, 124, and 141 are optical elements capable of changing the direction of the incident light by reflection.

The pin hole 122 is an optical element for reducing the beam diameter of a signal beam.

The SLM 123 spatially (two-dimensionally in this embodiment) modulates the signal beam and so as to multiplex data. The SLM 123 may be a transmissive liquid crystal device, a reflective element, such as a digital micromirror device (DMD) or a reflective liquid crystal device, or a grating light value (GLV) device. The SLM 123 has a high responsiveness, preferably, a responsive speed of 1 microseconds or less. The SLM 123 is controlled by the controlling unit 159.

The dichroic mirror 125 is an optical element capable of guiding the light beam used for recording and reproducing a hologram (i.e., a laser beam emitted from the light source 111) and the light beam used for servo control (a laser beam emitted from the servo light source 151) through the same light path. To correspond to the difference in wavelengths of the laser beams from the light source 111 and the servo light source 151, the dichroic mirror 125 transmits the beam used for recording and reproducing a hologram emitted from the light source 111 and reflects the beam used for servo control emitted from the servo light source 151. The surface of the dichroic mirror 125 is processed to form a film that totally transmits the beam used for recording and reproducing and totally reflects the light used for servo control.

The concave lens 126 is a lens for changing the convergence of the signal beam and the reference beam. Only the signal beam is passed through the concave lens 126 so that the focusing depths of the signal beam and the reference beam differ on the holographic recording medium 101.

The objective lens 127 is an optical element for focusing both the signal beam and the reference beam onto the holographic recording medium 101.

The Faraday elements 131 and 132 are optical elements capable of rotating the polarization planes of entering beams. The polarization plane of an s-polarized beam is rotated by 45° when entering the Faraday element 131 and, then, is rotated back by 45° when entering the Faraday element 132.

The polarized beam splitter 133 is an optical element capable of transmitting a polarized beam emitted from the Faraday element 131 and reflecting a return beam (reproduction beam) reflected at the holographic recording medium 101 and transmitted through the Faraday element 132. The polarized beam splitter 133 operates in combination with the Faraday elements 131 and 132.

The image pickup device 134 is an element capable of receiving the image of the reproduction light.

The shielding plate 142 is an optical element capable of blocking part of the reference beam so that the reference beam does not overlap with a signal beam.

The phase modulating element 143 is an optical element functioning as a phase mask capable of providing a random phase pattern or a predetermined phase pattern to the reference beam. The phase modulating element 143 may be frosted glass, a diffuser, or a spatial phase modulator. The phase modulating element 143 may also be a holographic element storing a phase pattern. If the phase modulating element 143 is a holographic element, a beam having a phase pattern is emitted from the holographic element during hologram reproduction.

The servo light source 151 is a light source for generating a beam used for servo control, such as tracking servo control and focusing servo control. The servo light source 151 emits a laser beam having a wavelength different from the laser beam emitted from the light source 111. For example, the servo light source 151 may be a laser diode that generates a beam having a wavelength of, for example, 650 nm that has a low sensitivity against the holographic recording medium 101.

The collimating lens 152 is an optical element capable of converting the laser beam emitted from the servo light source 151 into a collimated beam.

The grating 153 is an optical element includes two elements and is capable of splitting the laser beam emitted from the collimating lens 152 into three beams. The grating 153 splits the laser beam to carry out servo control.

The beam splitter 154 is an optical element capable of transmitting the laser beam emitted from the grating 153 and reflecting the return beam reflected at the holographic recording medium 101.

The condenser lens 155 is an optical element capable of focusing the return beam from the beam splitter 154 onto the light receiving element 157.

The cylindrical lens 156 is an optical element capable of changing the beam shape of the laser beam emitted from the condenser lens 155 from a circular shape to an oval shape.

The light receiving element 157 is an element capable of receiving the return beam and outputting a tracking error signal for tracking servo control and a focusing error signal for focusing servo control. The light receiving element 157 may be a charge coupled device (CCD).

The servo driving unit 158 is a driving mechanism for carrying out tracking control and focusing control by driving the objective lens 127 in accordance with the tracking error signal and the focusing error signal received from the light receiving element 157. The servo driving unit 158 includes driving coils 161 and 162.

Operation of Holographic Recording and Reproducing Apparatus

An overview of the operation of a holographic recording and reproducing apparatus is described below.

A. Recording

An overview of the operation of the holographic recording and reproducing apparatus during recording will be described below.

A laser beam emitted from the light source 111 is collimated at the collimating lens 112. The collimated beam emitted from the collimating lens 112 is split by the polarized beam splitter 113 into an s-wave signal beam and a p-wave reference beam.

The signal beam is reflected at the mirror 121. The beam diameter of the reflected signal beam is adjusted at the pin hole 122. Then, the intensity of the signal beam is spatially modulated by the SLM 123. The signal beam optically modulated at the SLM 123 is transmitted through the Faraday element 131, the polarized beam splitter 133, and the Faraday element 132, in this order, and is reflected at the mirror 124. The reflected signal beam is transmitted through the concave lens 126 where the focal point of the signal beam is adjusted on the holographic recording medium 101.

The reference beam transmitted through the polarized beam splitter 113 is reflected at the mirror 141. The reflected reference beam is shaped into a predetermined shape by blocking only the center of the beam with the shielding plate 142. In this way, the reference beam is not reflected at the mirror 124 and is guided along the same light path as that of the signal beam.

The objective lens 127 focuses the signal beam and the reference beam onto substantially the same location on the holographic recording medium 101 so that an interference pattern is generated on the holographic recording medium 101. As a result, data spatially modulated at the SLM 123 is records on the holographic recording medium 101 as a hologram.

Misalignment in tracking and focusing is corrected by operating the servo driving unit 158 in accordance with a servo control signal output from the light receiving element 157.

B. Reproduction

An overview of the operation of the holographic recording and reproducing apparatus during reproduction of a hologram will be described below.

During reproduction of a hologram, the signal beam is blocked and only the reference beam is incident on the holographic recording medium 101.

The reference beam emitted from the light source 111 and transmitted through the polarized beam splitter 113 is reflected at the mirror 141. Then, the center of the reflected reference beam is blocked by the shielding plate 142. Subsequently, the reference beam is transmitted through the dichroic mirror 125 and is incident on the holographic recording medium 101 as a reference beam having the same phase pattern as that of the beam used for recording by the phase modulating element 143.

When the reference beam having the same phase pattern as that of the beam used for recording is incident on the holographic recording medium 101, a diffractive beam (reproduction beam) is generated at the hologram stored on the holographic recording medium 101.

The reproduction beam emitted from the holographic recording medium 101 passes through the objective lens 127, the concave lens 126, and the dichroic mirror 125 along the same light path as the signal beam, but in the opposite direction, and is reflected at the mirror 124.

The polarization direction of the reproduction beam reflected at the mirror 124 is rotated at the Faraday element 132. As a result, the reproduction beam emitted from the Faraday element 132 is reflected at the polarized beam splitter 133. At the image pickup device 134, the reflected reproduction beam is converted into an electric signal corresponding to the two-dimensional spatial data obtained at the SLM 123. The output from the image pickup device 134 is digitalized into time-sequential digital data by a signal processing unit, not shown in the drawings.

Recording of Hologram by Phase Modulating Element 143

Figure 3:
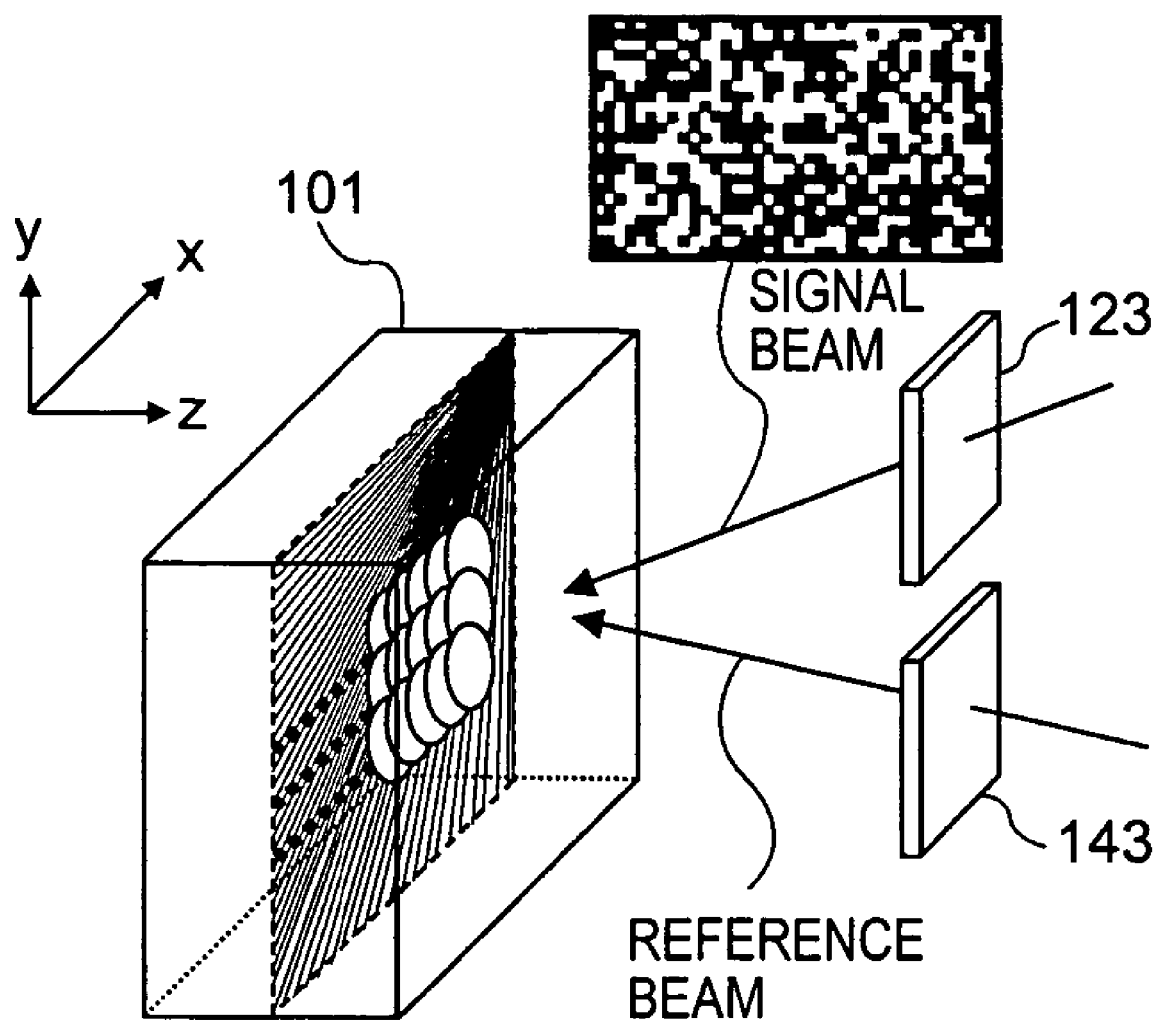
FIG. 3 is schematic view of a hologram recorded and reproduced by the holographic recording and reproducing apparatus.

FIG. 3 is a schematic view of a hologram recorded and reproduced by the holographic recording and reproducing apparatus.

As illustrated in FIG. 3, a hologram is recorded on the holographic recording medium 101 by allowing a signal beam spatially modulated at the SLM 123 and a reference beam having a random or predetermined phase pattern provided the phase modulating element 143 to interfere with each other. The hologram recorded on the holographic recording medium 101 can be reproduced by irradiating the holographic recording medium 101 with a reference beam having a phase pattern that matches the phase pattern of the beam used for recording the hologram (phase correlation multiplex system).

Here, multiplex recording is possible by shifting the holographic recording medium 101 or the phase modulating element 143 in the x direction or the y direction in FIG. 3.

By shifting the holographic recording medium 101 or the phase modulating element 143 in the x direction or the y direction in FIG. 3, the phase pattern of the reference beam changes and the diffraction efficiency is reduced.

As a result, multiplex recording based on a phase correlation multiplex system is possible using the phase modulating element 143, enabling large amount of data to be recorded. However, the holographic recording and reproducing apparatus according to an embodiment of the present invention does not necessarily require the multiplexing of data by the phase modulating element 143.

As described above, a hologram is formed on the holographic recording medium 101 when the reference beam and the signal beam interfere with each other. The following beams may be used as the reference beam and the signal beam.

The reference beam may be a beam that forms a real image or a Fourier image obtained at the phase modulating element 143 on the holographic recording medium 101. The reference beam may be a beam in the Fresnel region, forming an unclear image on the holographic recording medium 101.

The signal beam may be a beam that forms a real image or a Fourier image obtained at the SLM 123 on the holographic recording medium 101. The signal beam may be a beam that forms a somewhat defocused image of the real image or the Fourier image obtained at the SLM 123.

The image formation conditions of the reference beam and the recording beam are appropriately combined to form a hologram on the holographic recording medium 101 for recording data.

Control of Spatial Light Modulator 123 by Controlling Unit 159

Figure 4:
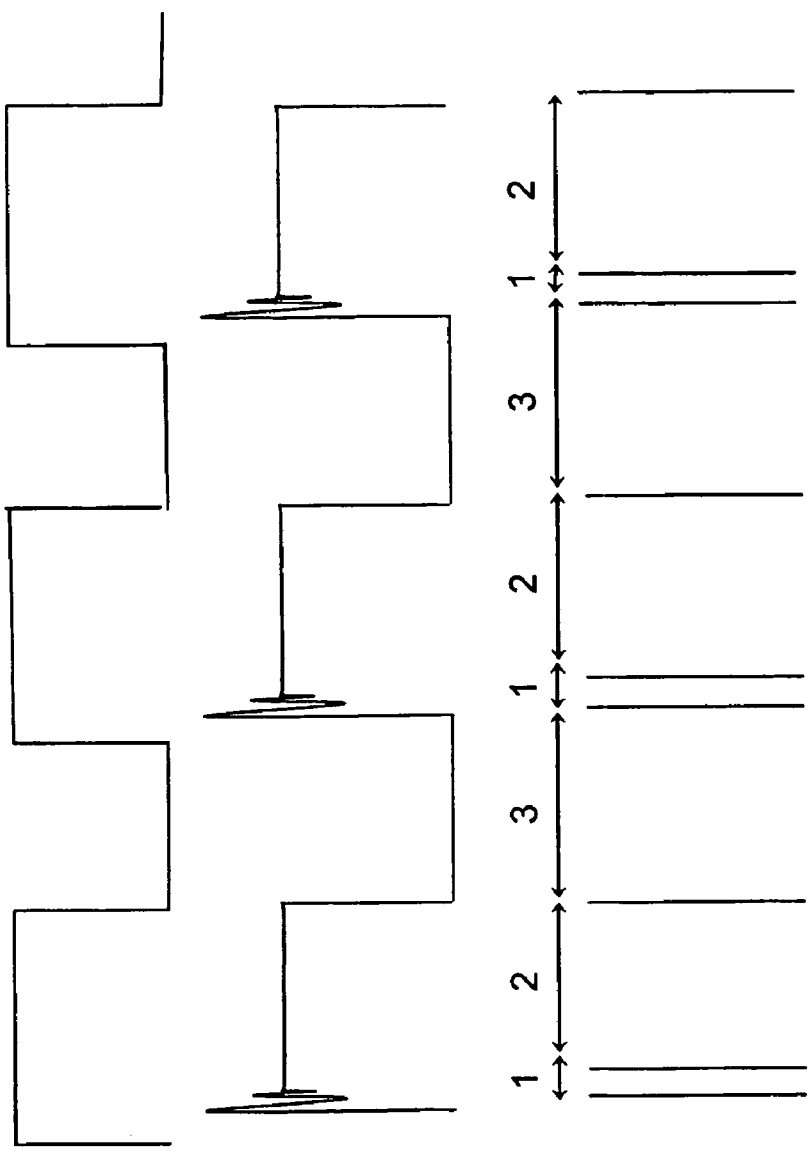
FIG. 4 is a waveform chart illustrating the control of a spatial light modulator by a controlling unit.

FIG. 4 is a waveform chart illustrating the control of the SLM 123 by the controlling unit 159. FIG. 4A is a waveform chart of a pulsed current applied to a laser diode (LD) used as the light source 111. FIG. 4B is an output waveform chart (where the vertical axis represents amplitude) of a laser beam output from the laser diode in response to the pulsed current applied to the laser diode. FIG. 4C illustrates the control pattern for controlling the SLM 123. The horizontal axes of FIGS. 4A, 4B, and 4C represent passage of time.

A laser beam, as shown in FIG. 4B, is output from the laser diode when a pulsed current, as shown in FIG. 4A, is applied to the laser diode. The rising edge of the laser output is delayed with respect to the rising edge of the pulsed current. The amplitude of the laser output from the laser diode fluctuates for a predetermined amount of time from the beginning of its risetime due to relaxation oscillation. The SLM 123 is controlled by the controlling unit 159 in accordance with the pattern illustrated in FIG. 4C.

Period 1, shown in FIG. 4C, extends for substantially the same amount of time as the duration of amplitude fluctuation of the laser output. During period 1, the SLM 123 displays a 'totally dark pattern.' If a liquid crystal device is used as the SLM 123, the totally dark pattern is a pattern displayed on the SLM 123 where all pixels do not transmit light. However, even if the SLM 123 displays a totally dark pattern, some beams of light may pass through the SLM 123. In other words, for example, even if one pixel or more in the SLM 123 transmits light, so long as the noise generated by the light transmitted through the pixel(s) is negligible, the pattern displayed on the SLM 123 at this time may be a referred to as a totally dark pattern. Period 1 extending for 'substantially' the same amount of time as the duration of amplitude fluctuation of the laser output may not extend for exactly the same amount of time as the duration of amplitude fluctuation of the laser output. In other words, so long as the noise generated is negligible, period 1 may extend for an amount of time shorter than the duration of amplitude fluctuation of the laser output.

As shown in FIG. 4C, the starting point of period 2 follows immediately after the end point of period 1, and the end point of period 2 substantially matches, for example, the rising edge of the laser output from the laser diode. A recording pattern is displayed on the SLM 123 during period 2. In other words, the SLM 123 displays a contrasting (dark and light) pattern representing the data to be recorded.

Period 3, shown in FIG. 4C, is a period of time that corresponds to neither period 1 nor period 2. During period 3, the pattern displayed on the SLM 123 is switched from a recording pattern to a dark pattern or to a reversed recording pattern. During period 3, the angle of the reference light is changed and the holographic recording medium 101 is moved.

According to this embodiment, the signal beam is not emitted onto the holographic recording medium 101 during period 1 when the waveform of the laser output from the laser diode is distorted, as shown in FIG. 4C, by displaying a totally dark pattern on the SLM 123. Then, the SLM 123 displays the recording pattern during period 2 when the laser output from the laser diode is stabilized so as to carry out actual recording.

By displaying a totally dark pattern in period 3 as in period 1, the pattern displayed on the SLM 123 may not have to be switched at the beginning of period 1.

By controlling the SLM 123 as described above, holographic recording can be prevented from being carried out when the laser output from the laser diode is unstable by prohibiting the interference of the two light waves while the laser output from the laser diode is unstable.

If an additional spatial phase modulator is used as the phase modulating element 143, in addition to the spatial phase modulator used as the SLM 123, both the signal beam and the reference beam can be blocked by displaying totally dark patterns during period 2, shown in FIG. 4C, on both the SLM 123 and the phase modulating element 143. In this way, the dynamic range of the holographic recording medium 101 can be prevented from being used up.

Structure of Light Source 111 According to Another Embodiment

Figure 5:
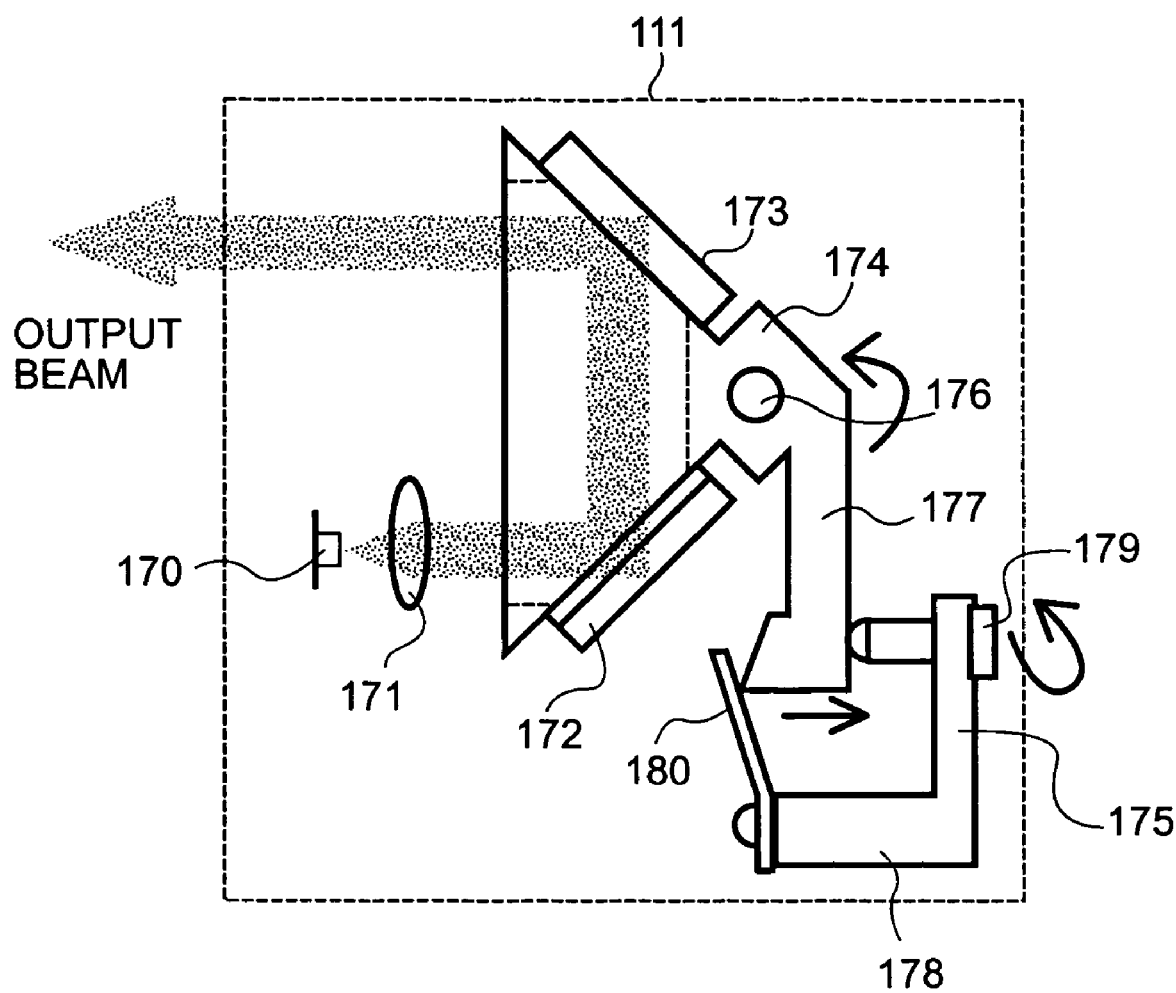
FIG. 5 is an exemplary schematic view of an external resonator laser.

FIG. 5 is a schematic view of a tunable laser (external resonator laser) device used as a light source 111 for recording and reproducing according to another embodiment.

The light source 111 includes a laser diode 170, a collimating lens 171, a diffraction grating 172, a mirror 173, a supporting member 174, and a rotational driving unit 175.

A laser diode 130 emits a pulsed laser beam in multimode. For example, the laser diode 130 emits a blue laser beam having a wavelength of about 410 nm.

The collimating lens 171 collimates the laser beam emitted from the laser diode 170.

The diffraction grating 172 emits first order beams in different directions corresponding to different wavelengths of the laser beams incident on the diffraction grating 172. The angle between the diffraction grating 172 and the laser diode 170 is set so that the first order beam having a predetermined wavelength (for example, 410 nm) returns to the laser diode 170. In this way, the predetermined wavelength component is amplified at the laser diode 170 and a single mode beam is generated. Most beams emitted from the laser diode 170 are not first order beams but are zero order beam that are reflected at the diffraction grating 172 like being reflected at a mirror. In other words, the light source 111 is basically a Littrow type external resonator laser.

The mirror 173 the laser beam reflected at the diffraction grating 172 along a light path in a predetermined direction.

The supporting member 174 supports the diffraction grating 172 and the mirror 173. The diffraction grating 172 and the mirror 173 are held at a fixed angle. In this way, even when the diffraction grating 172 is rotated, the emission direction of the laser beam is maintained by the mirror 173.

The supporting member 174 is rotatably supported by a shaft 176. The diffraction grating 172 and the mirror 173 are disposed on one side of the supporting member 174 and a rotational shaft 177 is provided on the other side as a unit of the supporting member 174.

The rotational driving unit 175 rotates the supporting member 174 around the shaft 176. The rotational driving unit 175 includes a main body 178, a screw 179 for pushing the rotational shaft 177, and a flat spring 180 for urging the rotational shaft 177 in a direction opposite to the direction the rotational shaft 177 is pushed by the screw 179. The screw 179 is rotated by, for example, a rotary driving motor, not shown in the drawing.

The light source 111 having the above-described structure is capable of rotating the diffraction grating 172 to change the wavelength of the blue laser light having, for example, a wavelength of 410 nm by about 5 nm.

The external resonator laser having the above-described structure has been proposed to increase coherence. Since a single laser diode chip generates a laser beam in multimode, the contrast of the hologram formed by this beam is low. Contrarily, an external resonator laser diode is capable of stably generating a single wavelength beam. When using this type of laser light source, the generated laser beam can be directly modulated. Thus, an additional device for modulating the laser beam for recording after the laser beam leaves the laser light source does not have to be provided. For this reason, an external resonator laser is promising as a break through for small holographic recording and reproducing apparatuses.

Figure 6:
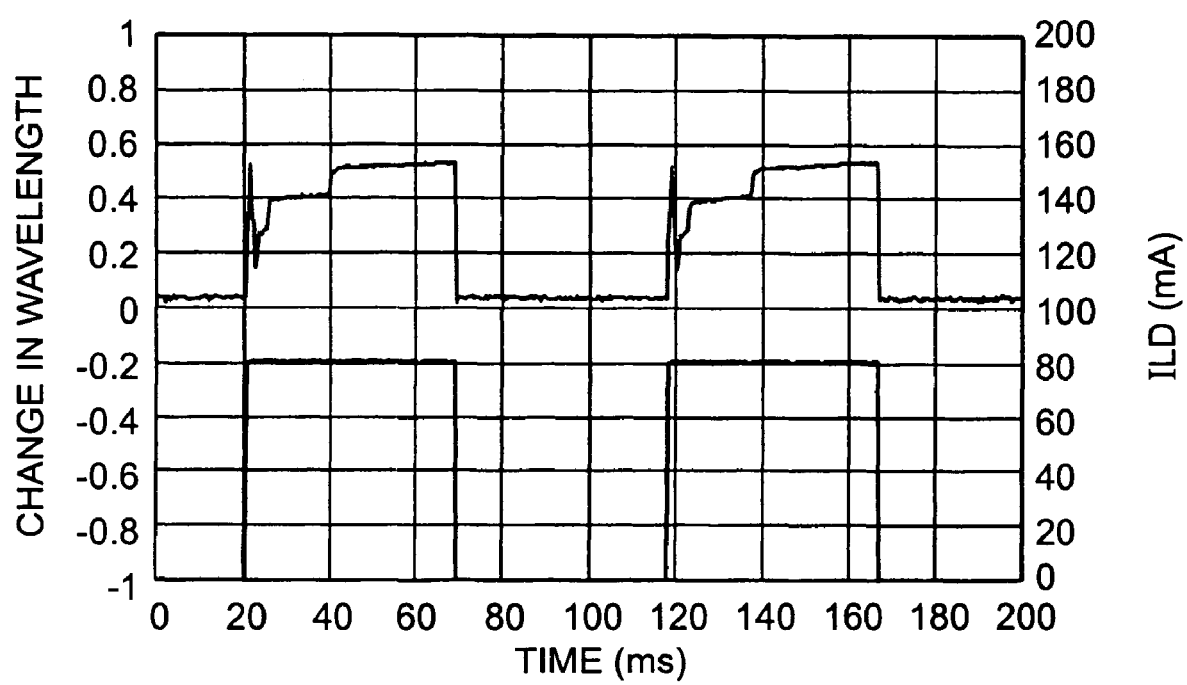
FIG. 6 is a waveform chart illustrating the change in wavelength of a laser beam generated by an external resonator laser.
Figure 7:
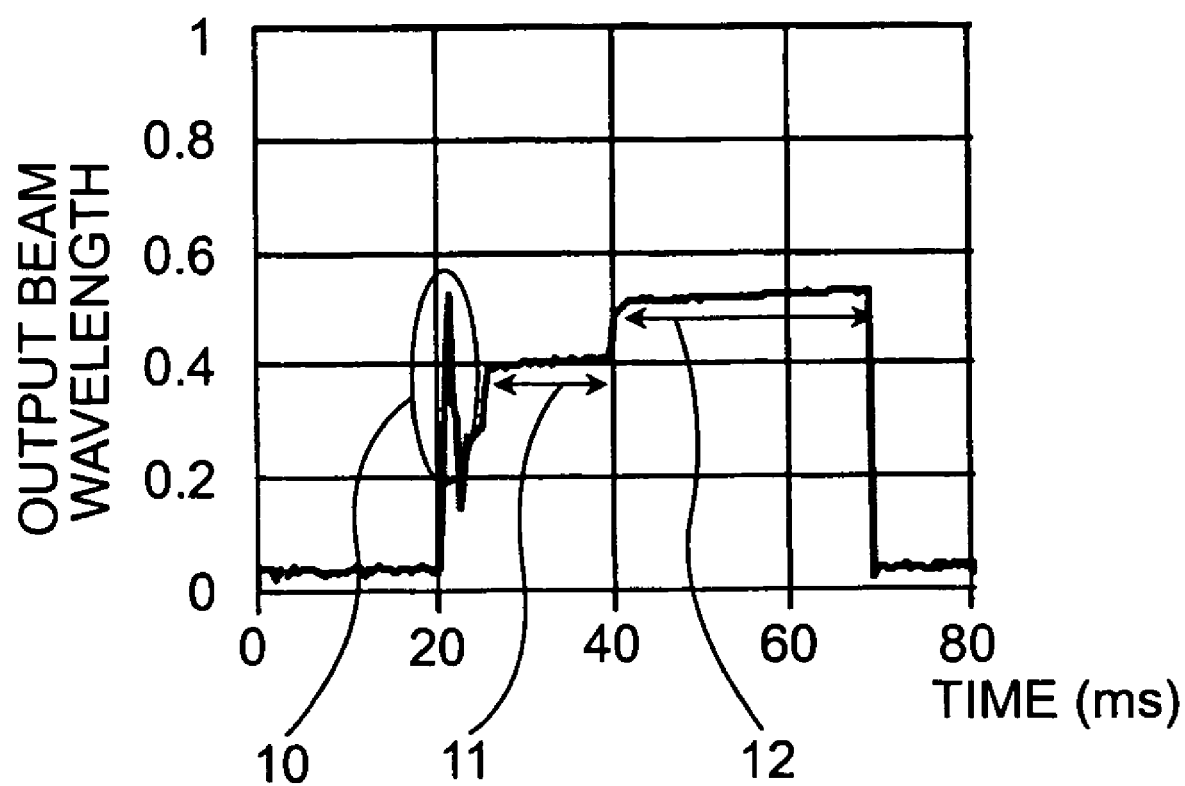
FIG. 7 is a partially enlarged view of FIG. 6.

However, as shown in FIGS. 6 and 7, the actual change A in the wavelength of the output laser pulse is great and is detected as a fluctuation having a serrated pattern that continues for several microseconds from the beginning of the risetime of the pulse (as indicated by an area 10 in FIG. 7). After the fluctuation is detected, the wavelength stabilizes (as indicated by an arrow 11 in FIG. 7), but, then, mode-hop of the wavelength occurs towards a longer wavelength in the external resonator length of the laser diode. Finally, the output stabilizes again (as indicated by an arrow 12 in FIG. 7).

In actual holographic recording, the change in wavelength corresponds to the change in the emission angle of the diffracted beam. Therefore, if the wavelength changes greatly, the emission angle changes significantly and causes noise. For this reason, it is preferable that the laser beam has a single, stable wavelength when recording one hologram.

Accordingly, in this embodiment, the controlling unit 159 controls the SLM 123 as illustrated in FIGS. 8A to 8D.

Figure 8:
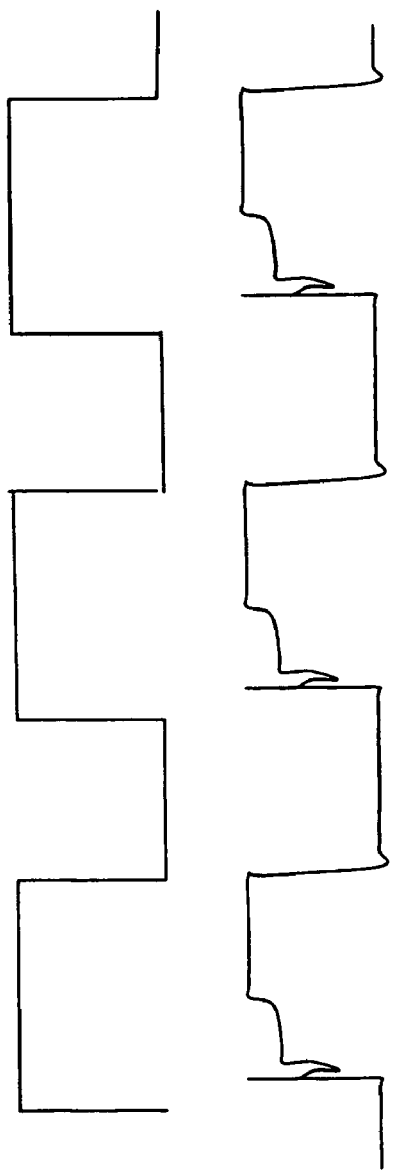
FIG. 8 is a waveform chart illustrating the control of a spatial light by a controlling unit modulator according to another embodiment.

FIG. 8A is a waveform chart of a pulsed current applied to the laser diode 170 in the light source 111. FIG. 8B is an output waveform chart (where the vertical axis represents amplitude) of a laser beam output from the laser diode in response to the pulsed current applied to the laser diode. FIG. 8C illustrates the control pattern for controlling the SLM 123. FIG. 8D illustrates another control pattern of the SLM 123. The horizontal axes of FIGS. 8A to 8D represent the same time.

A laser beam, as shown in FIG. 8B, is output from the laser diode when a pulsed current, as shown in FIG. 8A, is applied to the laser diode. The rising edge of the laser output is delayed with respect to the rising edge of the pulsed current. The amplitude of the laser output from the laser diode fluctuates for a predetermined amount of time from the beginning of its risetime (refer to FIGS. 6 and 7). The SLM 123 is controlled by the controlling unit 159 in accordance with the pattern illustrated in FIG. 8C.

Period 1, shown in FIG. 8C, extends for substantially the same amount of time as the duration of amplitude fluctuation of the laser output shown in the area 10 in FIG. 7. During period 1, the SLM 123 displays a 'totally dark pattern.'

As shown in FIG. 8C, the starting point of period 2 follows immediately after the end point of period 1, and the end point of period 2 substantially matches, for example, the rising edge of the laser output from the external resonator laser diode. A recording pattern is displayed on the SLM 123 during period 2. In other words, the SLM 123 displays a contrasting (dark and light) pattern representing the data to be recorded.

Period 3, shown in FIG. 8C, is a period of time that corresponds to neither period 1 nor period 2. During period 3, the pattern displayed on the SLM 123 is switched from a recording pattern to a dark pattern or to a reversed recording pattern. During period 3, the angle of the reference light is changed and the holographic recording medium 101 is moved.

According to this embodiment, the signal beam is not emitted onto the holographic recording medium 101 during period 1 when the waveform of the laser output from the external resonator laser is distorted, as shown in FIG. 8C, by displaying a totally dark pattern on the SLM 123. Then, the SLM 123 displays the recording pattern during period 2 when the laser output from the laser diode is stabilized so as to carry out actual recording.

By displaying a totally dark pattern in period 3 as in period 1, the pattern displayed on the SLM 123 may not have to be switched at the beginning of period 1. However, if it is necessary to continuously display a reversed pattern on the SLM 123, the reversed pattern may be displayed in period 3 and the totally dark pattern may be displayed in period 1.

By controlling the SLM 123 as described above, holographic recording can be prevented from being carried out when the laser output from the laser diode is unstable by prohibiting the interference of the two light waves while the laser output from the laser diode is unstable.

As described above, part of the laser beam whose wavelength changes greatly is not used for recording. For an optical system that might be greatly affected by the noise characteristics of a small wavelength change, such as an optical system in which pixels of the SLM 123 and the image pickup device 134 correspond one on one, the laser beam whose wavelength changes greatly (represented by the arrow 11 in FIG. 7) may be excluded, as illustrated in FIG. 8D, so that the recording pattern is displayed on the SLM 123 only in period 5.

By employing the above-described method, holographic recording can be prevented from being carried out when the laser output from the laser diode is unstable by prohibiting the interference of the two light waves while the laser output from the laser diode is unstable.

Figure 9:
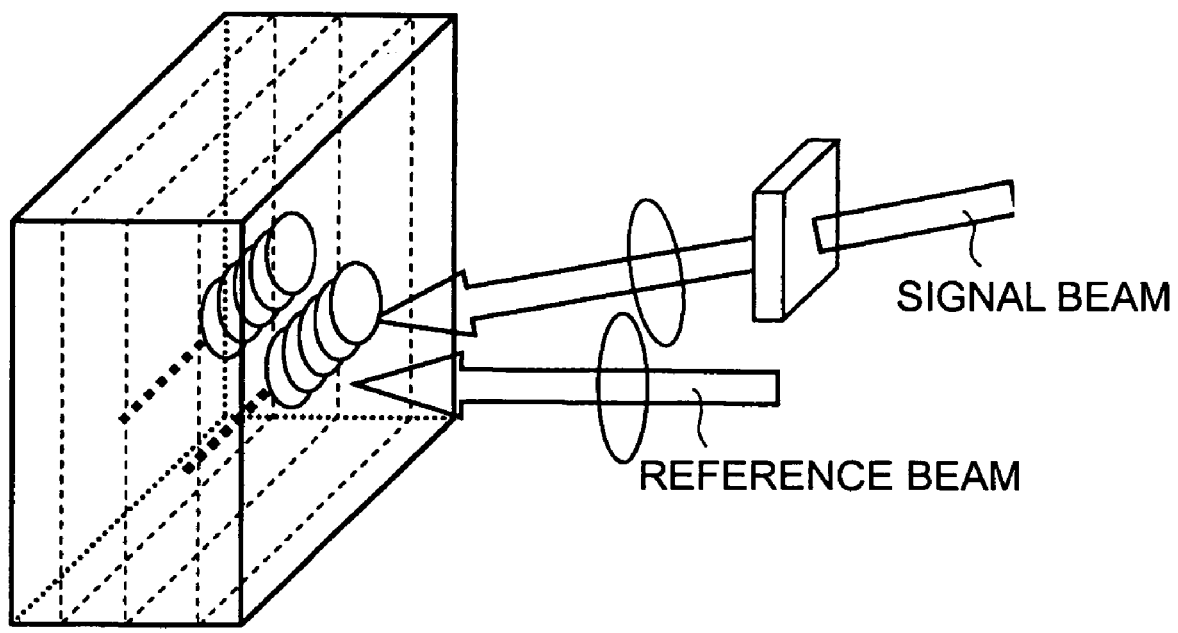
FIG. 9 is a schematic view of a two-beam optical system for holographic recording.
Figure 10:
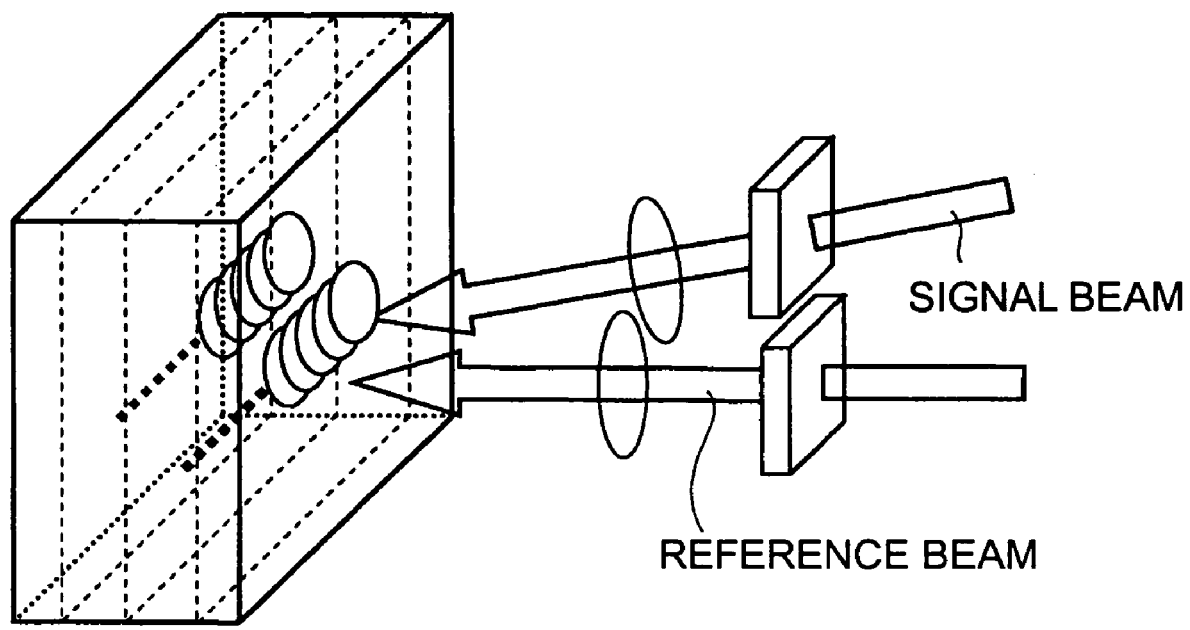
FIG. 10 is a schematic view of a spatial light modulator provided on the reference beam side of a two-beam optical system for holographic recording.
Figure 11:
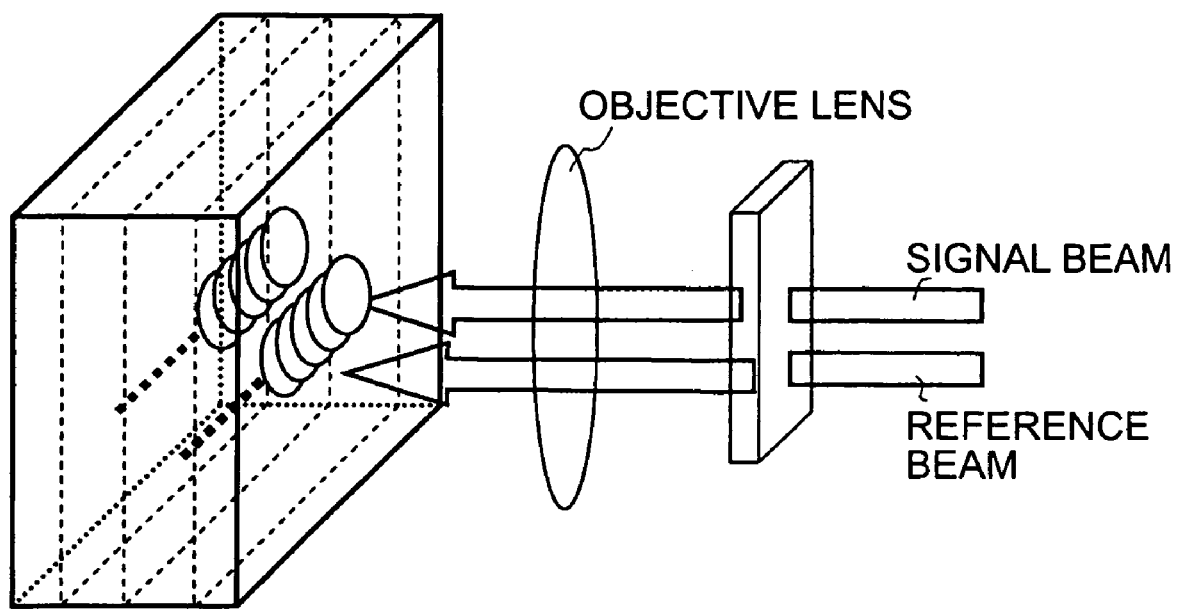
FIG. 11 is a schematic view of an optical system illustrated in FIG. 1.

If an additional spatial phase modulator is used as the phase modulating element 143, in addition to the spatial phase modulator used as the SLM 123, both the signal beam and the reference beam can be blocked by displaying totally dark patterns during period 2, shown in FIG. 8c, and period 5, in FIG. 8D, on both the SLM 123 and the phase modulating element 143. In this way, the dynamic range of the holographic recording medium 101 can be prevented from being used up. For example, in a two-beam optical system in which two beams of light used for typical angular multiplexing and phase correlation multiplexing, as illustrated in FIG. 9, are incident on the holographic recording medium 101 through two separate lens, if only the signal beam is modulated by a spatial phase modulator, the generation of a hologram including noise can be prevented but the dynamic range of the holographic recording medium 101 is used up by the incident reference beam because only the signal beam can be turned on and off. Contrarily, in a two-beam optical system (used for correlation multiplexing in some cases) having spatial light modulators provided for both the signal beam and the reference beam, the dynamic range of the holographic recording medium 101 can be prevented from being used up by simultaneously controlling both spatial light modulators. FIG. 11 is a schematic view of the optical system of the holographic recording and reproducing apparatus illustrated in FIG. 1. This optical system is capable of carrying out the above-described control in a similar manner as that illustrated in FIG. 10. Accordingly, the dynamic range of the holographic recording medium 101 can be prevented from being used up.

OTHER EMBODIMENTS

Other multiplexing methods according to another embodiment of the present invention include angular multiplexing, wavelength multiplexing, shift multiplexing, phase code multiplexing, and phase correlation multiplexing.

A light source for holographic recording according to another embodiment of the present invention not only includes a laser diode and an external resonator laser but also any type of light source capable of emitting a beam having an unstable output wavelength and/or waveform due to pulsed oscillation, such as a solid state laser using a second harmonic generation (SHG) crystal, a semiconductor laser, a distributed feedback (DFB) laser, or a gas laser.

It should be understood by those skilled in the art that various modifications, combinations, sub-combinations and alterations may occur depending on design requirements and other factors insofar as they are within the scope of the appended claims or the equivalents thereof.

The invention claimed is:

1. A hologram recording apparatus for carrying out holographic recording by emitting a signal beam and a reference beam onto a holographic recording medium, the apparatus comprising:
   a laser light source configured to output a pulsed laser beam;
   splitting means for splitting the laser beam into a signal beam and a reference beam;
   spatial light modulating means for modulating the signal beam or both the signal beam and the reference beam; and
   controlling means for controlling the spatial light modulator to modulate at least one of the signal beam and the reference beam with a totally dark pattern for a predetermined period of time, the predetermined period beginning no later than the start of the risetime of a pulse of a laser beam output from the laser light source.

2. The holographic recording apparatus according to claim 1, wherein
   the laser light source is a semiconductor laser, and
   the predetermined period is a period corresponding to the time required for stabilizing a fluctuation in amplitude detected at the rising edge of the pulse of the laser beam.

3. The holographic recording apparatus according to claim 1, wherein
   the laser light source is an external resonator laser, and
   the predetermined period is a period corresponding to the time required for stabilizing a fluctuation in wavelength of the laser beam detected at the rising edge of the pulse of the laser beam.

4. The holographic recording apparatus according to claim 3, wherein the fluctuation in wavelength of the laser beam is detected as a serrated pattern.

5. The holographic recording apparatus according to claim 3, wherein the fluctuation in wavelength of the laser beam is detected as a change in the wavelength to a longer wavelength caused by a mode-hop.

6. A method for holographic recording, comprising:
   outputting a pulsed laser beam;
   splitting the laser beam into a signal beam and a reference beam;
   modulating the signal beam or both the signal beam and the reference beam and carrying out holographic recording by emitting the signal beam and the reference beam onto a holographic recording medium; and controlling the modulation so that at least one of the signal beam and the reference beam is modulated with a totally dark pattern for a predetermined period of time, the predetermined period beginning no later than the start of the risetime of a pulse of a laser beam output from the laser light source.

7. The method for holographic recording according to claim 6, wherein the predetermined period is a period corresponding to the time required for stabilizing a fluctuation in amplitude detected at the rising edge of a pulse of the laser beam.

8. The method for holographic recording according to claim 6, wherein the predetermined period is a period corresponding to the time required for stabilizing a fluctuation in wavelength of the laser beam detected at the rising edge of a pulse of the laser beam.

9. The method for holographic recording according to claim 8, wherein the fluctuation in wavelength of the laser beam is detected as a serrated pattern.

10. The method for holographic recording according to claim 8, wherein the fluctuation in wavelength of the laser beam is detected as a change in the wavelength to a longer wavelength caused by a mode-hop.

11. A hologram recording apparatus for carrying out holographic recording by emitting a signal beam and a reference beam onto a holographic recording medium, the apparatus comprising:

a laser light source configured to output a pulsed laser beam;

a splitter configured to split the laser beam into a signal beam and a reference beam;

a spatial light modulator configured to modulate the signal beam or both the signal beam and the reference beam; and a controlling unit configured to control the spatial light modulator to modulate at least one of the signal beam and the reference beam with a totally dark pattern for a predetermined period of time, the predetermined period beginning no later than the start of the risetime of a pulse of a laser beam output from the laser light source.

* * * * *